US009688415B2

(12) United States Patent
Hall (10) Patent No.: US 9,688,415 B2
(45) Date of Patent: *Jun. 27, 2017

(54) AIRCRAFT HYBRID FUEL SYSTEM (71) Applicant: AAI Corporation, Hunt Valley, MD (US)

(72) Inventor: Brandon R. Hall, Stewartstown, PA (US)

(73) Assignee: AAI Corporation, Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,716

(22) Filed: Dec. 9, 2015

(65) Prior Publication Data
US 2016/0096630 A1 Apr. 7, 2016

Related U.S. Application Data (62) Division of application No. 14/184,050, filed on Feb. 19, 2014, now Pat. No. 9,221,546.

(51) Int. Cl.
B64D 37/04 (2006.01)
B64D 37/06 (2006.01)
B64D 37/16 (2006.01)
B64C 39/02 (2006.01)

(52) U.S. Cl.
CPC ............ *B64D 37/04* (2013.01); *B64C 39/024* (2013.01); *B64D 37/06* (2013.01); *B64D 37/16* (2013.01); *B64C 2201/021* (2013.01); *B64C 2201/06* (2013.01)

(58) Field of Classification Search
CPC ......... B64D 37/04; B64D 37/06; B64D 37/16
See application file for complete search history.

(56) References Cited

U.S. PATENT DOCUMENTS

| | | |
|---|---|---|
| 2,516,150 A | 7/1950 | Samiran |
| 2,519,968 A | 8/1950 | Jordan |
| 2,612,216 A | 9/1952 | Samiran |
| 2,860,652 A | 11/1958 | Badger, Jr. |
| 4,664,134 A | 5/1987 | Pera |
| 4,784,354 A | 11/1988 | Tavano |
| 5,779,190 A | 7/1998 | Rambo et al. |
| 6,082,671 A | 7/2000 | Michelson |
| 6,142,421 A | 11/2000 | Palmer |
| 6,182,714 B1 | 2/2001 | Ginsburgh et al. |
| 6,260,797 B1 | 7/2001 | Palmer |
| 7,278,607 B2 | 10/2007 | Fuller |
| 8,123,169 B2 | 2/2012 | Collette |
| 8,225,822 B2 | 7/2012 | Erben et al. |

(Continued)

*Primary Examiner* — Christopher P Ellis
*Assistant Examiner* — Jessica Wong
(74) *Attorney, Agent, or Firm* — BainwoodHuang (57) ABSTRACT An aircraft hybrid fuel system includes a main tank and a set of flexible bladders, the main tank and the set of flexible bladders defining a fuel containment space. The system further includes a set of pathways coupling the set of flexible bladders to the main tank. The set of pathways is constructed and arranged to vent gas out of the set of flexible bladders into the main tank while fuel from a fuel source is provided into the fuel containment space defined by the main tank and the set of flexible bladders. Along these lines, each flexible bladder can be provisioned with a fuel port to provide fuel, and a separate vent port to vent gas to the main tank.

20 Claims, 4 Drawing Sheets (56) References Cited

U.S. PATENT DOCUMENTS

| | | | |
|---|---|---|---|
| 8,336,810 B2 | 12/2012 | Brutoco | |
| 8,757,108 B2 | 6/2014 | Snell | |
| 8,820,681 B2 | 9/2014 | Brutoco | |
| 9,102,391 B2 | 8/2015 | Brutoco | |
| 9,221,546 B2* | 12/2015 | Hall | B64D 37/06 |
| 2003/0218098 A1 | 11/2003 | Goto et al. | |
| 2005/0178880 A1* | 8/2005 | Howe | B64D 37/04 244/10 |
| 2013/0032672 A1 | 2/2013 | Fenton | |
| 2014/0208943 A1* | 7/2014 | Gupta | B64D 37/32 95/14 |

* cited by examiner

AIRCRAFT HYBRID FUEL SYSTEM

BACKGROUND

A conventional fixed-wing unmanned aircraft (UA) is an aircraft which flies without a pilot on board. Such a UA typically holds fuel within its wings.

One conventional approach to holding fuel within UA wings (hereinafter referred to as the "wet-wing approach") involves storing fuel within the UA wings themselves, i.e., seams, rivet holes, joints, and other openings are sealed to enable the hollow cavities of the UA wings to store fuel directly. Another conventional approach to holding fuel within UA wings (hereinafter referred to as the "rigid tank approach") involves placing rigid (or hard) tanks into the UA wings and storing the fuel in the rigid tanks. Yet another conventional approach to holding fuel within UA wings (hereinafter referred to as the "bladder approach") involves placing fuel bladders into the UA wings and storing the fuel in the fuel bladders.

SUMMARY

Unfortunately, there are deficiencies to the above-described conventional approaches to holding fuel within UA wings. For example, the above-described conventional wet-wing approach is susceptible to leaks. That is, each sealed seam, rivet hole, joint, etc. in each UA wing is a potential point of failure. Accordingly, the conventional wet-wing approach requires constant inspection, and high maintenance to seal leaks when leaks are discovered.

Additionally, in the conventional rigid tank approach, the rigid tanks typically do not extend into gaps between framing members, tight areas, corners, etc. Accordingly, the conventional rigid tank approach does not make very efficient use of available UA wing cavity space. Also, as fuel is consumed and air enters the rigid tanks of a UA, humans controlling the UA from the ground become more reluctant to put the UA through high-G maneuvers (i.e., aerial maneuvers subjecting the UA to high gravitational forces) for fear of uncovering the fuel suction ports of the rigid tanks and then drawing air within the rigid tanks into the fuel lines. Rather, the UA operator may avoid putting the UA through extreme orientations once the rigid tanks get low on fuel in order to prevent exposure of the fuel suction ports.

Furthermore, in the conventional bladder approach, the bladders must be fully evacuated to remove excess air before refueling the bladders. It is also more difficult to find pinhole leaks within fuel bladders. One conventional inspection and refueling procedure requires the use of specialized fuel evacuation equipment and requires that the bladders are able to hold a vacuum for five minutes. Accordingly, the conventional bladder approach is expensive, burdensome, and time consuming.

In contrast to the above-identified conventional approaches to holding fuel within a UA, improved techniques are directed to an aircraft hybrid fuel system which includes a main tank and a set of flexible bladders, each of which vents into the main tank. With placement of flexible bladders in the aircraft wings, fuel is able to be stored with less leakage risk than that of the conventional wet-wing approach and more efficiently than that of the conventional rigid tank approach. Additionally, fuel within the flexible bladders can be completely drawn down without concern over exposing suction ports of the flexible bladders thus enabling full use of the bladder-stored fuel and freeing the aircraft of maneuvering restrictions. Furthermore, since each flexible bladder vents to the main tank, there is no need to evacuate the flexible bladders to remove excess air during refueling. Rather, any gases within the flexible bladders simply vent to the main tank as the flexible bladders are filled with fuel. Moreover, both the main tank and the set of flexible bladders can be fueled to a positive pressure thus maximizing the fuel storage capacity of the hybrid fuel system.

One embodiment is directed to a method of operating a hybrid fuel system of an aircraft. The method includes preparing the hybrid fuel system of the aircraft to receive fuel from a fuel source, the hybrid fuel system including a set of flexible bladders and a main tank. The method further includes providing, after the hybrid fuel system of the aircraft is prepared to receive fuel from a fuel source, fuel from the fuel source into a fuel containment space defined by the set of flexible bladders and the main tank while venting gas out of the set of flexible bladders into the main tank. The method further includes preparing, after fuel from the fuel source is provided into the fuel containment space, the hybrid fuel system to deliver the fuel to an engine of the aircraft.

In some arrangements, each flexible bladder includes a venting end and a sealed end. In these arrangements, providing fuel from the fuel source into the fuel containment space while venting gas out of the set of flexible bladders includes:
 (i) orienting the aircraft at an angle in which the venting end of each flexible bladder is positioned above the sealed end of that flexible bladder, and
 (ii) after orienting the aircraft at the angle, supplying fuel to fill the sealed end of each flexible bladder prior to filling the venting end of that flexible bladder.

In some arrangements, each flexible bladder includes (i) a container portion, (ii) a fuel port coupled to the container portion, and (iii) a venting port coupled to the container portion. In these arrangements, supplying fuel includes providing fuel through the fuel port of each flexible bladder while gas within that flexible bladder exits that flexible bladder through the venting port of that flexible bladder.

In some arrangements, the venting port of each flexible bladder connects to the main tank through a respective venting tube. In these arrangements, providing fuel includes supplying fuel through the fuel port of each flexible bladder while gas within that flexible bladder exits that flexible bladder into the main tank through the venting port of that flexible bladder and through the respective venting tube connecting that venting port to the main tank.

In some arrangements, a transfer pump is interconnected between the main tank and the set of flexible bladders. The transfer pump is constructed and arranged to pump fuel from the set of flexible bladders into the main tank. In these arrangements, supplying fuel through the fuel port of each flexible bladder while gas within that flexible bladder exits that flexible bladder into the main tank includes providing fuel into the set of flexible bladders through a set of paths that circumvents the transfer pump.

In some arrangements, a bypass valve is interconnected between the main tank and the set of flexible bladders. The bypass valve is constructed and arranged to allow and disallow fuel to flow between the set of flexible bladders into the main tank. In these arrangements, supplying fuel through the fuel port of each flexible bladder while gas within that flexible bladder exits that flexible bladder into the main tank includes:

(i) transitioning the bypass valve from a closed state to an open state to allow fuel to flow from the main tank into the set of flexible bladders, and (ii) after the bypass valve is transitioned to the open state, providing fuel from the fuel source into the main tank.

In some arrangements, transitioning the bypass valve from the closed state to the open state includes forming a bypass valve path between the main tank and the set of flexible bladders. The bypass valve path runs parallel to a transfer pump path between the main tank and the set of flexible bladders. The transfer pump path is formed by the transfer pump. In these arrangements, fuel in the main tank is allowed to flow from the main tank into the set of flexible bladders through the bypass valve path when the bypass valve is in the open state.

In some arrangements, the main tank includes a hard tank. In these arrangements, providing fuel from the fuel source includes filling the hard tank with fuel to sustain a positive fuel pressure within the hard tank (e.g., substantially 2.5 pounds per square inch).

In some arrangements, a positive pressure check valve is coupled to the hard tank. In these arrangements, providing fuel from the fuel source further includes stopping fuel delivery to the hard tank when fuel escapes from the hard tank through the positive pressure check valve (e.g., while fuel escapes at 2.5 psi).

In some arrangements, a negative pressure check valve is coupled to the hard tank. In these arrangements, the method further includes freeing the negative pressure check valve from obstructions to enable air to pass through the negative pressure check valve into the hard tank to prevent occurrence of negative pressure in the hard tank.

In some arrangements, the set of flexible bladders includes a left wing bladder disposed in a left wing of the aircraft and a right wing bladder disposed in a right wing of the aircraft. In these arrangements, providing fuel from the fuel source includes expanding the left wing bladder and the right wing bladder with fuel from the fuel source. The set of bladders is constructed and arranged to collapse as fuel is pumped from the set of bladders into the main tank.

In some arrangements, the method further includes operating a fuel delivery regulator to deliver fuel from the main tank to an engine of the aircraft and operating a transfer pump which transfers fuel from the set of flexible bladders to the main tank. Accordingly, the transfer pump is able to move fuel from the set of flexible bladders into the main tank while the regulator delivers fuel from the main tank to the engine.

In some arrangements, the method includes discontinuing operation of the transfer pump once fuel originally within the set of flexible bladders has been transferred to the main tank while continuing to operate the fuel delivery regulator to continue delivery of fuel from the main tank to the engine of the aircraft. Accordingly, each flexible bladder can be fully drawn of fuel thus maximizing bladder utilization.

In some arrangements, the aircraft is an unmanned aerial vehicle (UAV). In these arrangements, the fuel source can be a portable fuel tank and providing fuel from the fuel source can involve supplying fuel from the portable fuel tank into the main tank through a fuel port of the UAV, the fuel filling the set of flexible bladders and venting gas from the set of flexible bladders into the main tank as the fuel is supplied through the fuel port of the UAV.

Another embodiment is directed to an aircraft hybrid fuel system. The system includes a main tank and a set of flexible bladders, the main tank and the set of flexible bladders defining a fuel containment space. The system further includes a set of pathways coupling the set of flexible bladders to the main tank. The set of pathways is constructed and arranged to vent gas out of the set of flexible bladders into the main tank while fuel from a fuel source is provided into the fuel containment space defined by the main tank and the set of flexible bladders.

Other embodiments are directed to aerial vehicle apparatus, assemblies, subsystems, components, and so on. Some embodiments are directed to various processes and equipment which involve an aircraft hybrid fuel system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to an aircraft hybrid fuel system which includes a main tank and a set of flexible bladders, each of which vents into the main tank. With placement of flexible bladders in the aircraft wings, engine fuel can be stored with less leakage risk than that of conventional wet-wings and more efficiently than that of conventional rigid tanks. Additionally, fuel within the flexible bladders can be completely drawn down without concern over exposing suction ports of the flexible bladders thus enabling full use of the bladder-stored fuel and freeing the aircraft of maneuvering restrictions. Furthermore, since each flexible bladder vents to the main tank, there is no need to evacuate the flexible bladders to remove excess air during refueling. Rather, any gas within the flexible bladders simply vents to the main tank as the flexible bladders are filled with fuel. Moreover, both the main tank and the set of flexible bladders can be fueled to a positive pressure thus maximizing the fuel storage capacity of the hybrid fuel system.

Figure 1:
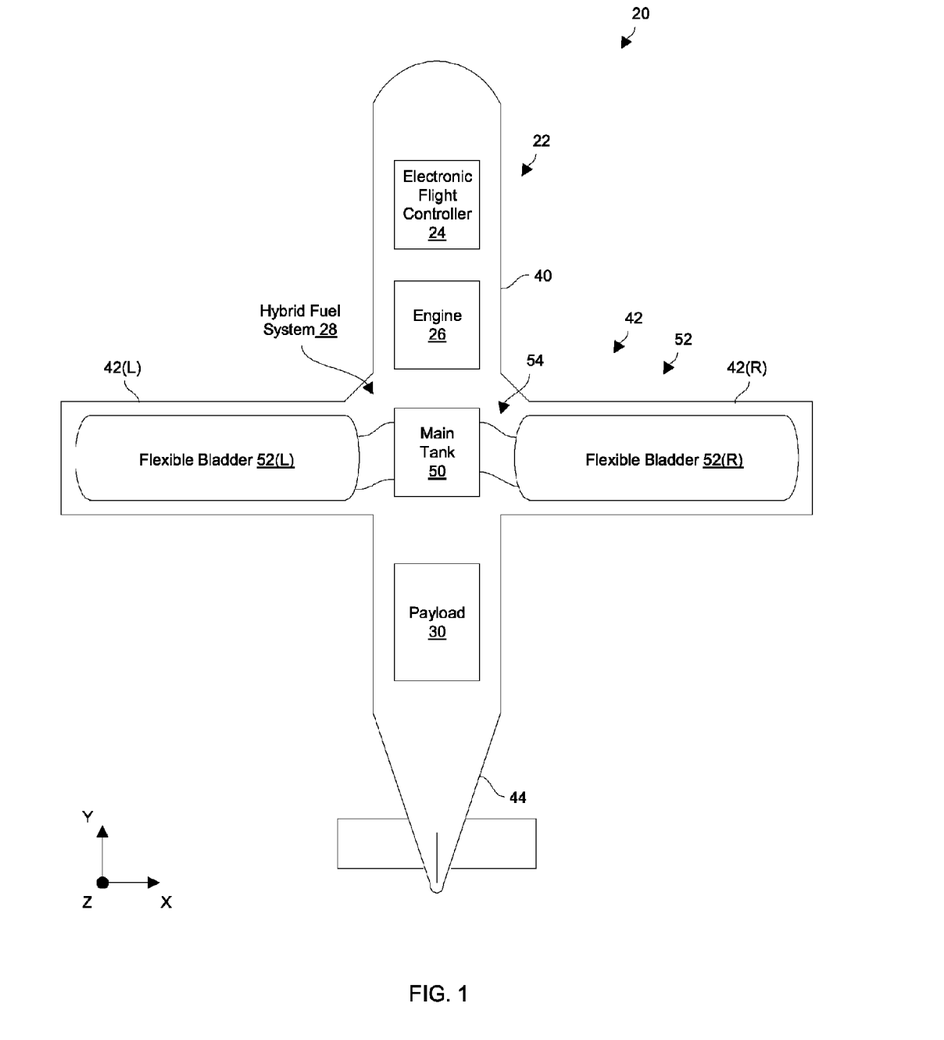
FIG. 1 is a general diagram of an aircraft which includes a hybrid fuel system.

FIG. 1 shows a general top view of an aircraft 20 which utilizes a hybrid fuel system. The aircraft includes an airframe 22, an electronic flight controller 24, an engine 26, a hybrid fuel system 28, and a payload 30. Although these components are not shown coupled together, it should be understood that these components are connected together, e.g., via mechanical elements, electronic control lines, sensors, and so on. By way of example, the aircraft 20 is described below as a fixed-wing unmanned aerial vehicle (UAV).

The airframe 22 is constructed and arranged to provide support and protection for the other components of the aircraft 20. As shown in FIG. 1, the airframe 22 includes, among other things, a main body section 40, a left wing 42(L), a right wing 42(R), and a tail section 44.

The electronic flight controller 24 is constructed and arranged to control the operation of the aircraft 20. Along these lines, the electronic flight controller 24 is capable of executing a preprogrammed flight plan, operating in accordance with instructions from a ground control station (GCS), or both. In particular, the electronic flight controller 24 is capable of controlling air speed via the engine 26, lift via angular deflection of ailerons of the left and right wings 42(L), 42(R) (collectively, wings 42), direction via operation of the tail section 44, and so on.

The engine 26 is constructed and arranged to provide propulsion for the aircraft 22. To this end, the engine 26 operates under control from the electronic flight controller 24.

The hybrid fuel system 28 is constructed and arranged to provide fuel to the engine 26. As will be explained in further detail shortly, the hybrid fuel system 28 includes a main tank 50, a left flexible bladder 52(L) disposed in the left wing 42(L), a right flexible bladder 52(R) disposed in the right wing 42(R), and a set of pathways 54 which enable the flexible bladders 52(L), 52(R) (collectively, flexible bladders 52) to vent gases into the main tank 50 while receiving fuel. With such venting of gas from the flexible bladders 52 into the main tank 50 during refueling, there is no need to evacuate the flexible bladders 52 prior to refueling as in a conventional bladder approach. Furthermore, fuel is stored efficiently within the wings 42 without leakage drawbacks of conventional wet-wings, and without fuel storage/usage inefficiencies of conventional rigid tanks.

The payload 30 is constructed and arranged to facilitate a particular mission or objective of the aircraft 20. For example, for a reconnaissance mission, the payload 30 may include surveillance equipment such as cameras, a radar subsystem, infrared sensors, etc. For an attack mission, the payload 30 may include a set of bombs, missiles, guns, and/or other artillery. For communications, the payload 30 may include wireless communications equipment, relays, and so on. In some arrangements, there may be multiple payloads 30 of different types thus enabling the aircraft 20 to perform a variety of operations during flight.

It should be understood that the particular aircraft wing shape, dimensions, and scale may be different than that shown in FIG. 1. For example, it should be understood that each wing 42 of the aircraft 20 includes ailerons, actuators, electronics, etc. and that the flexible bladders 52 are able to expand around these components and into tight spaces to efficiently utilize space within the wings 42. Further details will now be provided with reference to FIG. 2.

Figure 2:
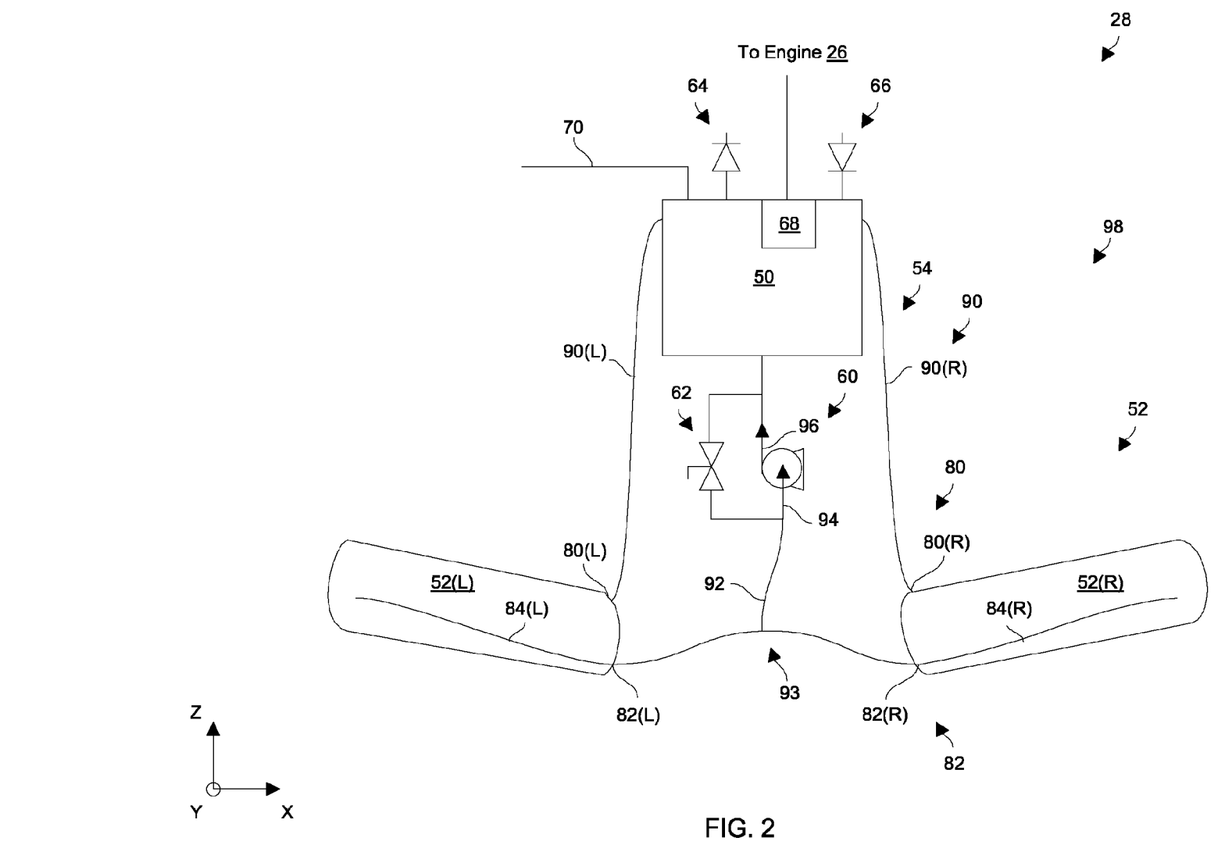
FIG. 2 is a general view showing particular details of the hybrid fuel system of FIG. 1.

FIG. 2 shows a side view of the aircraft hybrid fuel system 28 (also see FIG. 1). As shown in FIG. 2, the hybrid fuel system 28 includes a main tank 50, a set of flexible bladders 52, a set of fuel pathways 54, a transfer pump 60, a manually controlled bypass valve 62, a positive pressure check valve 64, a negative pressure check valve 66, an in-tank pump/regulator 68, and a fill line 70. The flexible bladders 52 are shown slightly tilted inward (i.e., the outboard ends being higher in the Z-direction than the inboard ends) to reflect possible anhedral aspects of the aircraft 20.

The main tank 50 includes a hard tank with stiff walls, and resides within the central body cavity of the airframe 22 (FIG. 1). Accordingly, the main tank 50 does not collapse in the manner of a flexible bladder as fuel is drawn from the main tank 50 for combustion by the engine 26. Rather, the main tank 50 is constructed and arranged to substantially maintain its shape regardless of the amount of fuel it holds.

Each flexible bladder 52 includes a vent port 80, and a fuel port 82 with a perforated draw tube 84. In particular, the left flexible bladder 52(L) includes a vent port 80(L), and a fuel port 82(L) with a perforated draw tube 84(L). Likewise, the right flexible bladder 52(R) includes a vent port 80(R), and a fuel port 82(R) with a perforated draw tube 84(R).

Each vent port 80 couples to the main tank 50 via a venting tube 90. In particular, the vent port 80(L) of the left flexible bladder 52(L) connects to the main tank 50 through a venting tube 90(L). Similarly, the vent port 80(R) of the right flexible bladder 52(R) connects to the main tank 50 through a venting tube 90(R). Such venting tubes 90 are constructed and arranged to carry gases from the flexible bladders 52 to the main tank 50 while the flexible bladders 52 fill with fuel.

Additionally, each fuel port 82 leads via a fuel line 92 to an input 94 of the transfer pump 60. As shown in FIG. 2, the fuel line 92 includes a branch 93 in order to connect to both fuel ports 82 to the input 94 of the transfer pump 60.

An output 96 of the transport pump 60 couples to the main tank 50. Accordingly, when the transfer pump 60 is in operation, the transfer pump 60 draws fuel from the flexible bladders 52 through their fuel ports 82 into the main tank 50.

Furthermore, the bypass valve 62 is coupled between the fuel line 92 and the main tank 50 to provide a parallel path to that of the transfer pump 60. That is, the bypass valve 62, when in an open state, allows fuel to circumvent the transfer pump 60 and flow between the main tank 40 and the flexible bladders 52, e.g., from the main tank 50 into the flexible bladders 52 through the bypass valve 62. Accordingly, as the flexible bladders 52 fill with fuel, any gases within the flexible bladders 52 are expressed from the flexible bladders 52 via the venting tubes 90 into the main tank 50.

However, the bypass valve 62, when in a closed state, does not allow fuel to circumvent the transfer pump 60. As a result, when the transfer pump 60 is in operation and the bypass valve 62 is closed, the transfer pump 60 is able to reliably draw fuel from the flexible bladders 52 into the main tank 50.

The positive pressure check valve 64 is constructed and arranged to prevent fuel under a predefined positive pressure from escaping a fuel containment space 98 formed by individual spaces within the main tank 50 and the set of flexible bladders 52. Rather, fuel is able to fill the containment space 98 and remain positive pressure. Since the positive pressure check valve 64 points in the outward direction relative to the main tank 50, the fuel containment space 98 can be filled with fuel until all gases are expressed through the positive pressure check valve 64, the fuel is eventually expressed from the positive pressure check valve 64 and is sustained under positive pressure. Suitable values for the predefine positive pressure include positive pressure values in the range of 1.0 to 5.0 psi (e.g., 1.5 psi, 2.0 psi, 2.5 psi, 3.0 psi, and 3.5 psi).

The negative pressure check valve 66 is constructed and arranged to allow air to enter the main tank 50. Since the negative pressure check valve 66 points in the inward direction relative to the main tank 50, no negative pressure is allowed to build within the fuel containment space 98 thus ensuring that fuel flows in only one direction, i.e., to the engine 26 (FIG. 1).

The in-tank pump/regulator 68 is disposed within the main tank 50 and supplies fuel from the main tank 50 to the engine 26 during operation. It should be understood that the in-tank pump/regulator 68 is shown at the top of the main tank 50 for simplicity even through the in-tank pump/regulator 68 is typically located at the bottom (e.g., in a fuel gathering reservoir within the main tank 50).

The fill line 70 is constructed and arranged to carry fuel from an external fuel source to the main tank 50. In particular, the fill line 70 leads from a fuel filling port from the outside of the aircraft 20 to the main tank 50. The fuel filling port is accessible by a user (e.g., by opening a lid, by removing a cap, etc.). Details of the operation of the hybrid fuel system 28 will now be provided with reference to FIG. 3.

Figure 3:
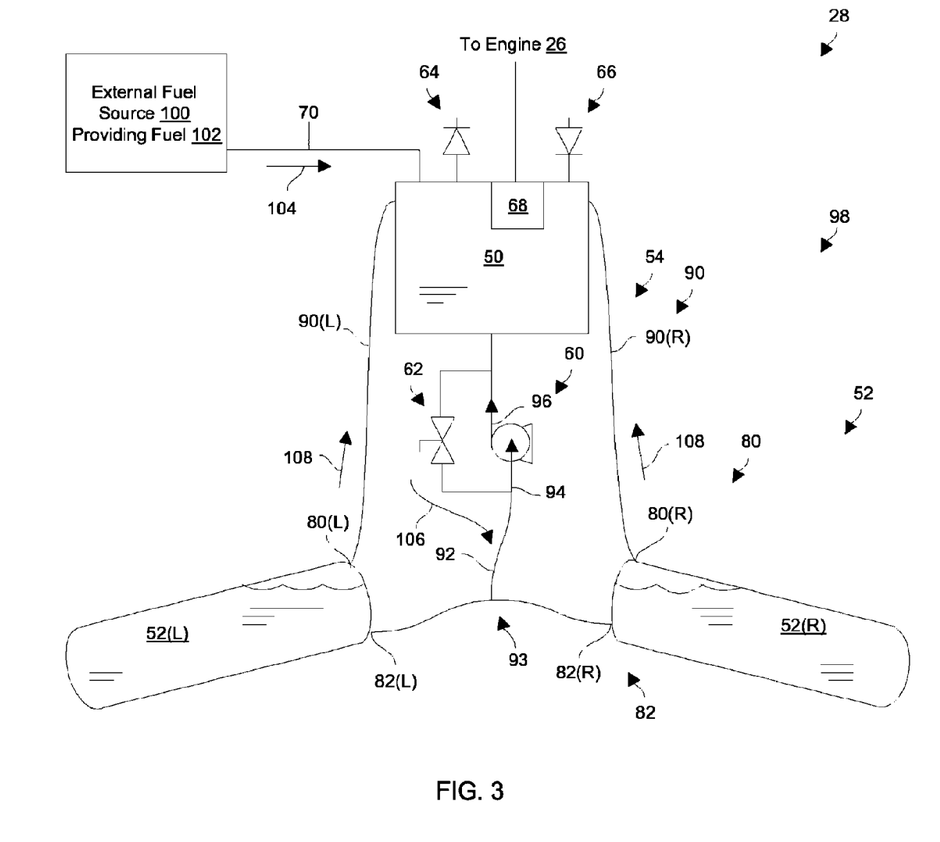
FIG. 3 is another view of the hybrid fuel system during a re-fueling process.

FIG. 3 is a view of the hybrid fuel system 50 during refueling. As shown, the flexible bladders 52 are now oriented so that the outboard ends are lower than the inboard ends, and so that the vent ports 80 are at the top of the flexible bladders 52. It should be understood that there are a variety of ways to orient the flexible bladders 52 into this geometry. Along these lines, the aircraft 20 can be angled or tilted (e.g., pointed nose up, pointed nose down, etc.). In some arrangements, the aircraft 20 can even be placed substantially upside down to orient the flexible bladders 52 into this geometry. In some arrangements, the wings 42 of the aircraft 20 are bendable (e.g., elastic) and are temporarily flexed and held in these positions during refueling.

Once the flexible bladders 52 of the hybrid fuel system 28 are oriented in the manner shown in FIG. 3 where the venting ports 80 are at the top and the fuel ports 82 are lower than the venting ports 80, a user then transitions the bypass valve 62 from the closed state to the open state. Accordingly, a pathway is now available which runs parallel to the transfer pump 60 between the main tank 50 and the set of flexible bladders 52.

An external fuel source 100 then provides fuel 102 into the main tank 50 through the fill line 70 (see arrow 104 in FIG. 3). As the fuel 102 enters the main tank 50, the fuel 102 flows through the bypass valve 62 and through the fuel line 92 (see arrow 106), and into the flexible bladders 52 through the fuel ports 82. As the flexible bladders 52 fill with fuel 102, any gas within the flexible bladders 52 is displaced through the vent ports 80 and through the venting tubes 90 into the main tank 50 (see arrows 108). That is, as fuel 102 enters each flexible bladder 52, the fuel 102 initially fills the sealed end (e.g., the outboard end) before filling the vented end (e.g., the inboard end). Accordingly, any gas percolates to the tops of the flexible bladders 52 and escapes through the vent ports 80. As a result, the flexible bladders 52 do not need to be evacuated (as in a conventional bladder approach) in order to purge the flexible bladders 52 of any gases. Rather, the flexible bladders 52 are simply filled with fuel 102 and gas is automatically vented through the vent ports 80 into the main tank 50.

During the course of filling the main tank 50 with fuel 102, the main tank 50 builds up positive pressure. When the positive pressure exceeds the threshold of the positive pressure valve 64, gas first exits through the positive pressure valve 64 since the positive pressure valve 64 is located at the top of the main tank 50. Moreover, the flexible bladders 52 become completely filled with fuel 102 and fully expand into the cavities of the wings 42 (FIG. 1) to maximize utilization of wing space.

After all of the gas is forced from the flexible bladders 52 through the venting tubes 90, the vent ports 80 pass fuel 102 into the venting tubes 90 which then enters the main tank 50. Ultimately, the entire fuel containment space 98 formed by the main tank 50 and the flexible bladders 52 becomes filled with fuel 102 under positive pressure. Accordingly, fuel 102 exits through the positive pressure valve 64 which signals the user that the hybrid fuel system 28 is filled with fuel 102. The user then stops delivery of fuel 102 from the fuel source 100 and disconnects the fuel source 100 from the fill line 70. Additionally, the user closes the bypass valve 62 to prevent fuel from circumventing the transfer pump 60. Furthermore, the user may cap (or seal) the fill line 70 to prevent fuel from escaping through the fill line 70.

At this point, the hybrid fuel system 28 is maximally filled and ready to deliver fuel to the engine 26. In particular, during flight, the electronic flight controller 24 (FIG. 1) activates the in-tank pump/regulator 68 to deliver fuel 102 from the main tank 50 to the engine 26, and the transfer pump 60 to draw fuel from the flexible bladders 52 into the main tank 50.

As fuel is drawn by the transfer pump 60 into the main tank 50, the flexible bladders 52 are designed to collapse thus enabling full use of all the fuel 102 in the flexible bladders 52. In some arrangements, sensors monitor operation of the transfer pump 60 during flight. For example, the revolutions per minute (rpms) of the transfer pump 60 can be measured to determine when the transfer pump 60 is no longer pumping fuel 102 (i.e., the transfer pump may spin at a fast rate when there is no fuel 102 in the flexible bladders 52 left to pump).

In some arrangements, the venting pathways between the vent ports 80 and the main tank 50 (see the venting tubes 90) are provisioned with check valves that are oriented toward the main tank. Such check valves prevent any air within the main tank 50 from being drawn back into the flexible bladders 52 through the vent ports 80 during flight. However, during refueling, any gas in the flexible bladders 52 easily passes through the check valves from the flexible bladders 52 into the main tank 50.

Even after the transfer pump 60 is deactivated following emptying of the flexible bladders 52, the electronic flight controller 24 continues to operate the in-tank pump/regulator 68 to deliver fuel 102 remaining in the main tank 50 to the engine 26. In some arrangements, the main tank 50 may even maintain positive pressure after the flexible bladders 52 have been depleted of fuel 102 (e.g., if the venting pathways are provisioned with check valves).

Ultimately, the main tank 50 eventually empties. During such emptying of the main tank 50, the negative pressure valve 66 allows air to enter the main tank 50 prevent the main tank 50 from encountering negative internal pressure that could cause fuel 102 to flow in the wrong direction or cause fuel cavitation at the fuel pump inlet.

Once the aircraft 20 has completed its mission, the hybrid fuel system 28 can be refueled by simply repeating the above-described process. That is, there is no need to evacuate the flexible bladders 52 before refueling. Rather, any gas in the flexible bladders 52 will be purged through the vent ports 80 into the main tank 50. Accordingly, the hybrid fuel system 28 is a rich and reliable fuel delivery mechanism, and is easy to use and maintain. Further details will now be provided with reference to FIG. 4.

Figure 4:
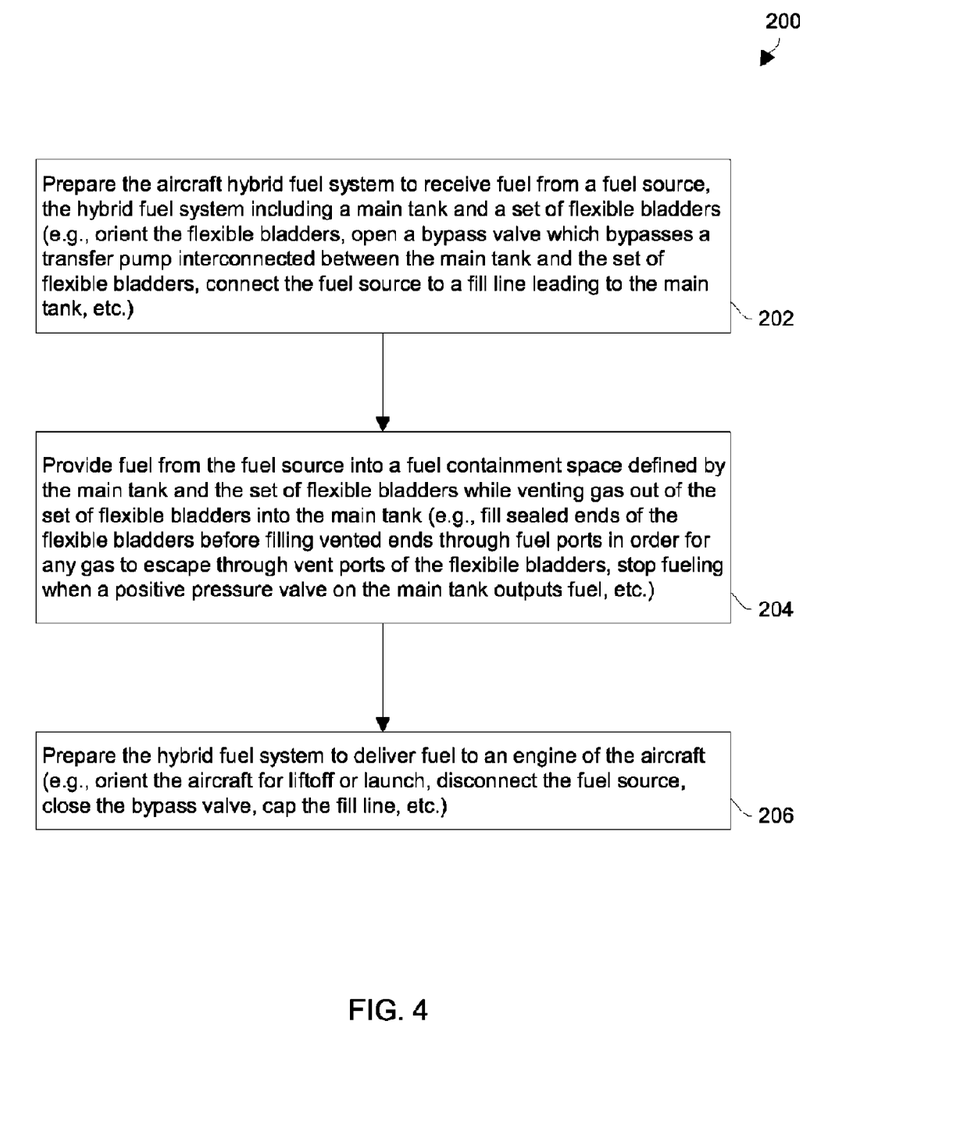
FIG. 4 is a flowchart of a procedure which is performed using the hybrid fuel system of FIG. 1.

FIG. 4 shows a procedure 200 for operating a hybrid fuel system of an aircraft. At 202, a user prepares the hybrid fuel system of the aircraft to receive fuel from a fuel source, the hybrid fuel system including a set of flexible bladders in the aircraft wings and a main tank (also see FIGS. 1-3). Along these lines, the user orients the set of flexible bladders (e.g., by tilting the aircraft if necessary, by flexing the wings if necessary, etc.) so that the vent port of each flexible bladder is at the top. Additionally, the user opens a bypass valve between the main tank and the set of flexible bladders to provide a fuel path that circumvents a transfer pump which pumps fuel from the set of flexible bladders into the main tank during flight. Furthermore, the user connects the fuel source to the fill line leading to the main tank.

At 204, the user provides fuel from the fuel source into a fuel containment space defined by the set of flexible bladders and the main tank while venting gas out of the set of flexible bladders into the main tank. In particular, fuel enters the main tank first and then passes through the fuel path of the opened bypass valve into the set of flexible bladders. As fuel fills the flexible bladders (e.g., filling the sealed ends before filling the vented ends, also see FIG. 3), any gas within the set of flexible bladders is concurrently displaced into the main tank through the vent ports. The user continues to provide fuel until a positive pressure check valve releases the gas in the fuel containment space and then outputs fuel indicating that the fuel containment space is filled with fuel. The user then stops providing fuel from the fuel source into the main tank. The positive pressure within the fuel containment space (e.g., 2.5 psi) ensures that the flexible bladders have expanded into the available wing cavities for efficient use of space.

At 206, the user prepares the hybrid fuel system to deliver the fuel to an engine of the aircraft. Here, the user closes the bypass valve, removes the fuel source, and caps the fill line (also see FIG. 3). The user may then re-orient the aircraft if necessary in order for the aircraft to launch or lift off. At this point, the aircraft (e.g., a UAV) is properly fueled for flight.

As described above, improved techniques are directed to an aircraft hybrid fuel system 28 which includes a main tank 50 and a set of flexible bladders 52, each of which vents into the main tank 50. With placement of flexible bladders 52 in the aircraft wings 42, fuel 102 is able to be stored with less leakage risk than that of the conventional wet-wing approach and more efficiently than that of the conventional rigid tank approach. Additionally, fuel 102 within the flexible bladders can be completely drawn down without concern over exposing suction ports of the flexible bladders 52 thus enabling full use of the bladder-stored fuel and freeing the aircraft of maneuvering restrictions. Furthermore, since each flexible bladder 52 vents to the main tank 50, there is no need to evacuate the flexible bladders 52 to remove excess air during refueling. Rather, any gases within the flexible bladders 52 simply vent to the main tank 50 as the flexible bladders 52 are filled with fuel 102. Moreover, both the main tank 50 and the set of flexible bladders 52 can be fueled to a positive pressure thus maximizing the fuel storage capacity of the hybrid fuel system 28.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the hybrid fuel system 28 was described above in the context of a UAV by way of example only. Other types are vehicles are suitable for use as well such as unmanned aircraft (UA) generally, organic air vehicles (OAVs), micro air vehicles (MAVs), unmanned ground vehicles (UGVs), unmanned water vehicles (UWVs), unmanned combat air vehicles (UCAVs), manned vehicles, and so on.

Additionally, it should be understood that the hybrid fuel system 28 was described above as having a branched fuel line 92 by way of example only. In an alternative arrangement, separate fuel lines 92 lead from the fuel ports 82 to the input 94 of the transfer pump 60. In such and arrangement, each fuel line 92 may connect to the main tank 50 via a respective bypass valve 62.

Furthermore, it should be understood that the pump/regulator 68 that delivers fuel to the engine 26 was described above as residing within the main tank 50 by way of example only. In other arrangements, the pump/regulator 68 is a separate inline pump/regulator which is external to the main tank 50. In some arrangements, the external pump/regulator has a return to tank line. Such modifications and enhancements are intended to belong to various embodiments of the disclosure.

What is claimed is:

1. An aircraft hybrid fuel system, comprising:
   a main tank;
   a set of flexible bladders, the main tank and the set of flexible bladders defining a fuel containment space; and
   a set of pathways coupling the set of flexible bladders to the main tank, the set of pathways being constructed and arranged to vent gas out of the set of flexible bladders into the main tank while fuel from a fuel source is provided into the fuel containment space defined by the main tank and the set of flexible bladders;
   wherein each flexible bladder includes a venting end and a sealed end;
   wherein the set of pathways couples the venting end of each flexible bladder to the main tank; and
   wherein, when the aircraft is oriented at an angle in which the venting end of each flexible bladder is positioned above the sealed end of that flexible bladder, fuel provided into the fuel containment space fills the sealed end of each flexible bladder prior to filling the venting end of that flexible bladder.

2. An aircraft hybrid fuel system as in claim 1 wherein each flexible bladder includes (i) a container portion, (ii) a venting port coupling the container portion to the main tank through a respective venting tube of the set of pathways, and (iii) a fuel port constructed and arranged to allow fuel to pass into and out of the container portion, the fuel port being separate from the venting port.

3. An aircraft hybrid fuel system as in claim 2, further comprising:
   a transfer pump which is interconnected between the fuel port of each flexible bladder and the main tank, the transfer pump being constructed and arranged to pump fuel from the set of flexible bladders to the main tank during operation.

4. An aircraft hybrid fuel system as in claim 3, further comprising:
   a bypass valve which is interconnected between the fuel port of each flexible bladder and the main tank, the bypass valve being constructed and arranged to transition between (i) a closed state in which no fuel passes therethrough and (ii) an open state which provides a bypass valve path between the main tank and the set of flexible bladders, the bypass valve path running parallel to a transfer pump path provided by the transfer pump during operation.

5. An aircraft hybrid fuel system as in claim 4 wherein the main tank includes a hard tank; and wherein the aircraft hybrid fuel system further comprises:
   a positive pressure check valve coupled to the hard tank to permit fuel to escape from the hard tank under a predefined positive pressure, and
   a negative pressure check valve coupled to the hard tank to permit air to pass into the hard tank to prevent occurrence of negative pressure in the hard tank.

6. An aircraft hybrid fuel system as in claim 1 wherein the set of flexible bladders includes a left wing bladder disposed in a left wing of the aircraft and a right wing bladder disposed in a right wing of the aircraft; and
   wherein the left wing bladder and the right wing bladder are constructed and arranged to expand in response to fueling from the fuel source, and collapse as fuel is pumped from the left wing bladder and the right wing bladder into the main tank.

7. An aircraft hybrid fuel system as in claim 1, further comprising:
a fuel delivery regulator coupled to the main tank, the fuel delivery regulator being constructed and arranged to deliver fuel from the main tank to an engine of the aircraft.

8. An aircraft hybrid fuel system as in claim 7, further comprising:
a transfer pump which is interconnected between the set of flexible bladders and the main tank, the transfer pump being constructed and arranged to pump fuel from the set of flexible bladders to the main tank during operation.

9. An aircraft hybrid fuel system as in claim 8 wherein the fuel delivery regulator and the transfer pump are constructed and arranged to operate independently to enable discontinuation of operation of the transfer pump once fuel originally within the set of flexible bladders has been transferred to the main tank while continuing to operate the fuel delivery regulator to continue delivery of fuel from the main tank to the engine of the aircraft.

10. An aircraft hybrid fuel system as in claim 1, further comprising:
a fuel port which provides direct access to the main tank; and
wherein the aircraft is an unmanned aerial vehicle (UAV);
wherein the fuel source is an external portable fuel tank; and
wherein the fuel port supports delivery of fuel from the external portable fuel tank into the main tank, the fuel filling the set of flexible bladders and venting gas from the set of flexible bladders into the main tank as the fuel is delivered through the fuel port of the UAV.

11. An unmanned aerial vehicle (UAV), comprising:
an airframe;
an engine supported by the airframe; and
an aircraft hybrid fuel system supported by the airframe and coupled to the engine, the aircraft hybrid fuel system including:
a main tank,
a set of flexible bladders, the main tank and the set of flexible bladders defining a fuel containment space, and
a set of pathways coupling the set of flexible bladders to the main tank, the set of pathways being constructed and arranged to vent gas out of the set of flexible bladders into the main tank while fuel from a fuel source is provided into the fuel containment space defined by the main tank and the set of flexible bladders;
wherein each flexible bladder includes a venting end and a sealed end;
wherein the set of pathways couples the venting end of each flexible bladder to the main tank; and
wherein, when the UAV is oriented at an angle in which the venting end of each flexible bladder is positioned above the sealed end of that flexible bladder, fuel provided into the fuel containment space fills the sealed end of each flexible bladder prior to filling the venting end of that flexible bladder.

12. An unmanned aerial vehicle as in claim 11 wherein the airframe includes a left wing and a right wing;
wherein the set of flexible bladders includes a left wing bladder disposed in the left wing and a right wing bladder disposed in the right wing; and
wherein the left wing bladder and the right wing bladder are constructed and arranged to expand in response to fueling from the fuel source, and collapse as fuel is pumped from the left wing bladder and the right wing bladder into the main tank.

13. An unmanned aerial vehicle as in claim 11 wherein the aircraft hybrid fuel system further includes:
a fuel delivery regulator interconnected between the engine and the main tank of the aircraft hybrid fuel system, the fuel delivery regulator being constructed and arranged to deliver fuel from the main tank to the engine.

14. An unmanned aerial vehicle as in claim 11 wherein the aircraft hybrid fuel system further includes:
a fuel port which provides direct access to the main tank;
wherein the fuel source is an external portable fuel tank; and
wherein the fuel port supports delivery of fuel from the external portable fuel tank into the main tank, the fuel filling the set of flexible bladders and venting gas from the set of flexible bladders into the main tank as the fuel is delivered through the fuel port.

15. An aircraft hybrid fuel system as in claim 1 wherein each flexible bladder of the set of flexible bladders is constructed and arranged to collapse as fuel volume shrinks within that flexible bladder due to fuel being drawn from that flexible bladder.

16. An aircraft hybrid fuel system as in claim 15 wherein, after each flexible bladder has been depleted of fuel, the main tank sustains positive pressure due to deactivation of at least some of the pathways connecting the main tank to the set of flexible bladders.

17. An aircraft hybrid fuel system as in claim 2 wherein the aircraft hybrid fuel system is constructed and arranged to be tilted from an initial angle to a refueling angle in which the venting port of each flexible bladder resides at a higher height than the fuel port of that flexible bladder when refueling the aircraft hybrid fuel system to express gas from that flexible bladder into the main tank through the venting port while, concurrently, fuel flows from the main tank into that flexible bladder through the fuel port.

18. An unmanned aerial vehicle as in claim 11 wherein each flexible bladder of the aircraft hybrid fuel system includes (i) a container portion, (ii) a venting port coupling the container portion to the main tank through a respective venting tube of the set of pathways, and (iii) a fuel port constructed and arranged to allow fuel to pass into and out of the container portion, the fuel port being separate from the venting port.

19. An unmanned aerial vehicle as in claim 18 wherein the aircraft hybrid fuel system further includes:
a transfer pump which is interconnected between the fuel port of each flexible bladder and
the main tank, the transfer pump being constructed and arranged to pump fuel from the set of flexible bladders to the main tank during operation.

20. An unmanned aerial vehicle as in claim 19 wherein the aircraft hybrid fuel system further includes:
a bypass valve which is interconnected between the fuel port of each flexible bladder and the main tank, the bypass valve being constructed and arranged to transition between (i) a closed state in which no fuel passes therethrough and (ii) an open state which provides a bypass valve path between the main tank and the set of flexible bladders, the bypass valve path running parallel to a transfer pump path provided by the transfer pump during operation.

* * * * *